Jan. 26, 1971     E. M. JOST     3,558,359
METHOD FOR FORMING BATTERY ELECTRODE PLATES
Filed Dec. 20, 1967
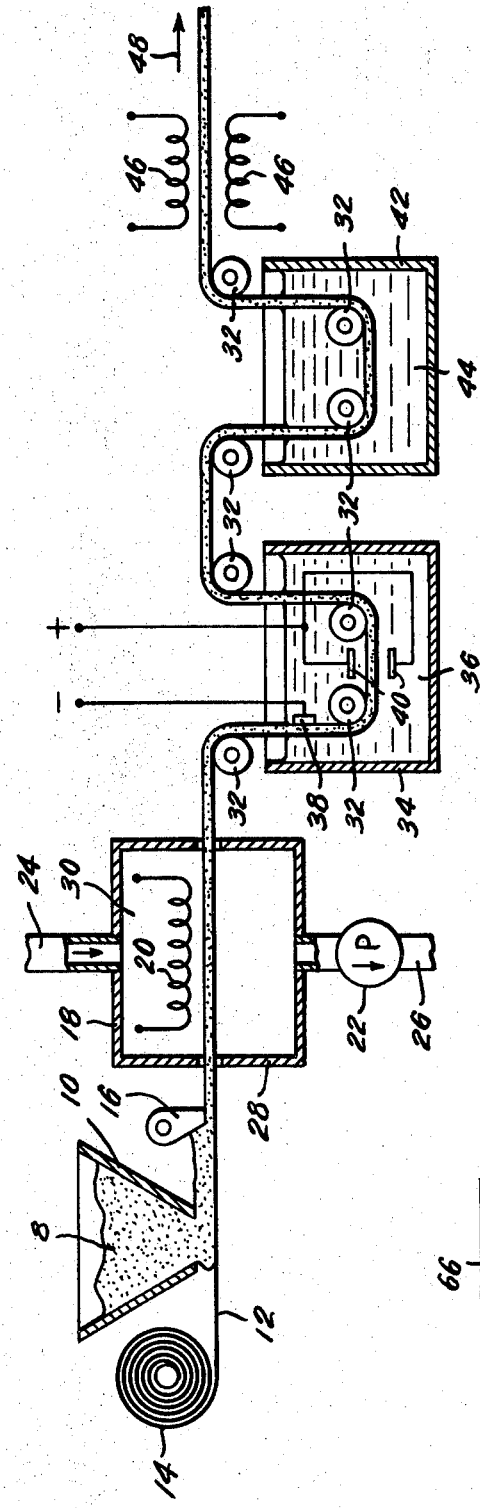
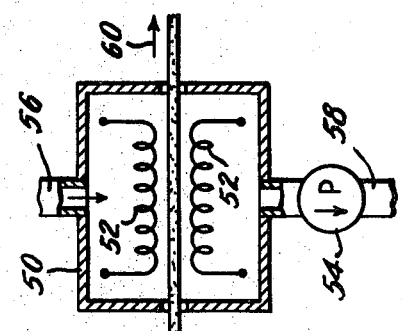
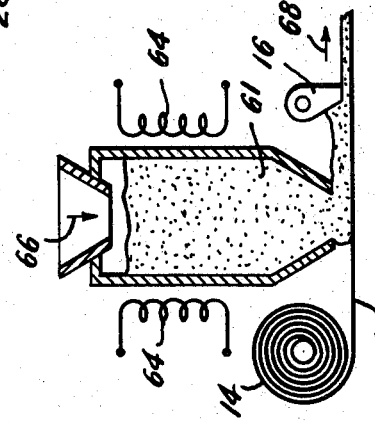
INVENTOR,
*Ernest M. Jost,*
BY
*James P McAndrews*
Att'y.

United States Patent Office 3,558,359
Patented Jan. 26, 1971

3,558,359
METHOD FOR FORMING BATTERY ELECTRODE PLATES
Ernest M. Jost, Plainville, Mass., assignor to Texas Instruments Incorporated, Dallas, Tex., a corporation of Delaware
Filed Dec. 20, 1967, Ser. No. 692,189
Int. Cl. H01m 43/04; B01k 1/00; C23c 3/04
U.S. Cl. 136—24                                             13 Claims

ABSTRACT OF THE DISCLOSURE

A method for forming nickel and cadmium battery electrode plates for use in sealed, rechargeable nickel-cadmium batteries and the like is shown to comprise the steps of spreading monohydrate or dihydrate cadmium or nickel nitrate powders upon a porous, sintered metal plaque, melting said powders for impregnating the plaque with the nitrate, and converting the nitrate materials to electrochemically active nickel and cadmium materials within the plaque pores to form battery plaques.

---

At the present time, battery plaques comprising nickel metal mesh having nickel metal powders sintered thereto are conventionally used to form nickel and cadmium battery plates for use in sealed, rechargeable nickel-cadmium batteries and the like by impregnating the plates with materials which are subsequently converted within the plaque pores to form electrochemically active materials. In the conventional process for making such battery plates, the porous plaque structures are immersed in concentrated solutions of nickel or cadmium nitrates for impregnating the plaque pores with the nitrate solutions. The impregnated plaques are then immersed in sodium or potassium hydroxide solutions while the plaques are subjected to cathodic treatment to form electrochemically active nickel or cadmium hydroxide deposits directly within the plaque pores.

Unfortunately, when the plaque pores are fully impregnated with the described nitrate solutions and when the cadmium or nickel hydroxide deposits are formed from the solutions, only a relatively small part of the plaque pore, that is, the conversion of the nitrate solutions to hydroxide precipitates is accompanied by a sharp change in volume so that a quantity of nitrate solution filling a plaque pore results in the formation of only sufficient hydroxide to fill approximately 10–13% of the volume of the plaque pore. As battery plates desirably have as much as 30–40% of their pore volume filled with electrochemically active material, use of the described conventional process for forming battery plates has required repeated impregnation and formation steps in order to fill the plaque pores with sufficient active material. This is a time-consuming and expensive process which contributes substantially to the cost of producing battery plates.

Proposals have been made to immerse porous, sintered plaque materials in baths formed of fused or molten water-free nitrate materials for impregnating plaque pores with the desired nitrates. However, molten baths of such water-free nitrates are quite unstable. Further the molten nitrate reacts vigorously with the plaque materials, frequently resulting in such rapid corrosion of the plaque materials that the impregnated plaques have had insufficient strength to permit ordinary handling. The reactions occurring between the plaque materials and the molten nitrate baths also tend to result in the formation of even more corrosive nitrites and ammonium salts within the melts. Thus the baths rapidly change in composition so that they become useless in forming additional plate materials and must be discarded.

It is an object of this invention to provide a novel and improved method for making nickel and cadmium battery plate materials; to provide such methods by which porous plaque materials of conventional type are rapidly and economically impregnated with electrochemically active nickel or cadmium materials; to provide such methods in which said plaque materials are impregnated with the desired quantities of active nickel or cadmium materials in a single sequence of steps of the invented methods; to provide such methods in which the plaque materials are readily impregnated with the desired active materials without significantly reducing the strength of the plaque materials; and to provide such methods which are particularly adapted for continuous operation to form long lengths of battery plate materials.

Other objects, advantages and details of the methods of this invention appear in the following detailed description of preferred embodiments of the invention, the detailed description referring to the drawings in which:

FIG. 1 is a diagrammatic view illustrating a preferred embodiment of the method of this invention;

FIG. 2 is a diagrammatic view illustrating an alternate embodiment of the method of this invention; and FIG. 3 is a partial diagrammatic view illustrating another alternate embodiment of the method of this invention.

In accordance with this invention, battery electrode plates are made from nitrates and from conventional, porous, sintered battery plaques in the following manner. First, the commercially available cadmium or nickel nitrate salts, which have a significant crystal water content, are dried by mild heating or the like to form monohydrate or dihydrate salts. These salts are then pulverized to form a fine powder and the powder is spread upon a conventional, porous, sintered nickel plaque material to form a powder layer of selected thickness. The plaque material with its layer of nitrate powder is then heated for melting or fusing the powder so that the nitrate material flows into the pores of the plaque material. The plaque material, impregnated with the desired nitrates, is then treated cathodically or in other conventional manner for converting the nitrates in situ within the plaque pores to form the desired electrochemically active material, thereby to form the desired battery electrode plate.

For example, in making a cadmium battery electrode plate for use as the negative electrode material in a sealed, nickel-cadmium battery, commercially available tetrahydrate cadmium nitrate salts are subjected to mild heating at a temperature substantially below the melting temperature of the salts for reducing the crystal water content of the salt. This heating is preferably performed while the salts are disposed in a neutral or non-oxidizing atmosphere. As drying of the commercially available salts to reduce their crystal water content can be performed in any conventional manner, the drying procedure is not further described herein and it will be understood that the salts are preferably dried to obtain monohydrate cadmium nitrate. These dried salts are then pulverized in a ball mill or the like to form a fine powder preferably having an average particle size on the order of 10–100 microns.

As illustrated in FIG. 1, the powdered, dried cadmium nitrate salts 8 are placed in a feed hopper 10 wherein the salts may be maintained in heated condition or can be otherwise treated for maintaining the low crystal water content of the salts. A strip of porous, sintered battery plaque material 12 is then fed from a supply reel 14 past the hopper 10 so that the powdered nitrate is fed from the hopper and is spread upon one surface of the plaque material. Preferably, a doctor blade 16 or other spreader means is arranged as shown to form a layer of salt powder of selected thickness on the plaque material. As the plaque material can be of any conventional type, the plaque is not further described herein and it will be understood that the plaque preferably comprises a nickel mesh material having nickel powder sintered thereto to form a porous plaque structure, the plaque having about 80% or more of its total volume devoted to plaque pores which are preferably of a cross-sectional size on the order of from 10–100 microns. For forming conventional battery electrode plates, the plaque material preferably comprises a 10″ wide strip having a thickness on the order of 0.025″.

In accordance with this invention, the plaque and its coating of madmium-nitrate powder are fed into an oven or furnace, diagrammatically indicated by the housing 18 and heating coil means 20 in FIG. 1, wherein the plaque and powder are heated to a temperature sufficient to melt or fuse the nitrate powder without tending to melt or otherwise significantly affect the plaque material. For example, the plaque and powder are preferably heated to a temperature of about 200–230° C. which is sufficient to melt the powder and to provide the melted powder with sufficiently low viscosity so that the melted nitrates flow into the pores of the sintered plaque material. If desired, pump means 22 or the like can be arranged to cooperate with inlet and outlet tubes 24 and 26 to circulate gas through the furnace to lower the pressure at one side 28 of the housing and to raise the pressure at the opposite side 30 of the housing, thereby to establish sufficient pressure differential to facilitate flowing of the melted nitrate materials into the plaque pores. This flushing system also tends to draw off any corrosive gases which may result from reactions between the melting nitrate powders and the nickel plaque materials in contact therewith. Preferably the pump means 22 circulate an inert or non-oxidizing gas such as helium gas to establish the desired pressure differential within the housing 18.

In accordance with this invention, the plaque material, now impregnated with the melted nitrate salts, is fed out of the described furnace for cooling and solidifying the nitrate material within the plaque pores. Where the nitrate powder has been melted by heating the salts to a temperature only slightly above the salt melting temperature, sufficient cooling of the impregnated plaque to retain the salts within the plaque pores is easily accomplished by moving the impregnated plaque a few feet in air at room temperature. However, various other conventional cooling systems can also be employed for solidifying the molten nitrate salts within the scope of this invention.

The impregnated plaque material is then treated for converting the nitrate impregnate to the desired electrochemically active cadmium material. For example, as illustrated in FIG. 1, the impregnated plaque is fed over rolls 32 from the described furnace into a tank 34 containing an aqueous sodium or potassium hydroxide solution 36 wherein the nitrate impregnate is cathodically converted in situ within the plaque pores to form electrochemically active cadmium hydroxide material. That is, the impregnated plaque is engaged by a conventional brush contact means 38 comprising a negative electrode and is moved between positive electrodes 40 formed of nickel plates or the like for cathodically converting the cadmium nitrate impregnate to active cadmium hydroxide. As this step of converting the nitrate to active material is well known in the art, it is not further described herein. Preferably, as illustrated in FIG. 1, the plaque, now impregnated with active cadimum material, is fed through a washing tank 42 where the plaque is washed in water 44 or the like for removing all traces of the previous sodium or potassium hydroxide bath as will be understood. The impregnated plaque is then dried in any conventional manner as is indicated diagrammatically by the heating coil 46, for completing formation of the desired cadmium battery electrode plate. The plate is then fed in the direction of the arrow 48 to a station (not shown) wherein the plate is cut into selected lengths or is coiled on take-up reel or the like.

If desired, the plaque, impregnated with molten nitrates, can be thermally treated for converting the nitrate material to electrochemically active material as is illustrated in FIG. 2. That is, as the impregnated plaque is fed from the furnace housing 18, it is cooled below the melting temperature of the nitrate by moving the plaque for a few feet through air at room temperature. The plaque with its solidified nitrate impregnate is then fed into a second furnace, diagrammatically indicated by the housing 50 and the heating coils 52, wherein pump means 54 cooperate with inlet and outlet tubes 56 and 58 to circulate hydrogen gas over the heated plaque for thermally decomposing the cadmium nitrate plaque impregnate to form electrochemically active cadimum hydroxide material in situ within the plaque pores. This thermal conversion of the cadmium nitrate is performed, for example, at a temperature of about 260° C. As thermal conversion of cadmium nitrate to active cadmium material is well known, it is not further described herein and it will be understood that heating and flushing of the impregnated plaque with gaseous reactants conventionally employed in such thermal conversions can be used within the scope of this invention. After thermal conversion of the nitrate to active cadmium material, the resulting battery electrode plate material is fed in the direction indicated by the arrow 60 in FIG. 2 to be coiled or cut into pieces of selected size.

In another alternate procedure according to this invention, the monohydrate cadmium nitrate salts above described can be initially applied to the porous, sintered plaque material in molten form. For example, after dehydration of the salts in the manner above described, the salts are melted as at 61 in a liquid feed hopper such as is diagrammatically indicated in FIG. 3 by the tank 62 and heater coils 64. Only small quantities of the melted salts 61 are contained in the hopper at any one time, but additional powered salts are continuously fed into the hopper to be melted therein as indicated by the arrow 66 in FIG. 2. If desired, a neutral or non-oxidizing atmosphere can be maintained within the liquid feed hopper in any conventional manner. In this way, any tendency of the molten salts to decompose in the hopper is reduced. Preferably, in order to provide the cadmium nitrate salts with sufficient viscosity to properly flow from the hopper, the salts are melted at a temperature on the order of 220° C.

The molten salts are fed from the hopper onto a porous, sintered nickel plaque material as above described as the plaque is fed past the hopper. These molten salts are then spread by a doctor blade 16 or the like to form a molten salt layer of selected thickness on the plaque. After advancing the coated plaque for a selected distance to permit the molten salts to flow into the plaque pores and to solidify therein, the impregnated plaque is advanced in the direction indicated in FIG. 3 by the arrow 68 to a cathodic or thermal conversion station such as has been described above with reference to FIGS. 1 and 2.

For forming nickel battery electrode plates for use as positive electrodes in sealed, nickel-cadmium batteries and the like, commercially available hexahydrate nickel nitrate salts can be treated for significantly reducing the crystal water content of the salts. Preferably these nickel nitrates are dried by heating the salts at a temperature below the melting temperature of the salts to form dihydrate salts. These salts are then applied to the conventional porous, sintered nickel plaque in the manner above described. In this regard, the nickel nitrate material applied to the plaque in powder form in the manner described with reference to FIG. 1 is preferably melted or fused at a temperature on the order of 230° C. for filling the plaque pores. This plaque impregnate is then cathodically converted to electrochemically active nickelic hydroxide material in situ within the plaque pores in well known manner. Alternatively, where the nickel nitrate impregnate is to be thermally converted to active material as described above with reference to FIG. 2, the plaque having a solidified nickel nitrate impregnate therein is preferably heated to a temperature on the order of 250° C. in a water containing atmosphere for thermally converting the nitrate to the active nickel hydroxide material. Alternatively, if the nickel nitrate is to be applied to the plaque material in molten form as is described with reference to FIG. 3, the nickel salt material is preferably melted at a temperature on the order of 230° C.

In the process above described, the initial dehydration of the commercially available cadmium and nickel nitrate salts to form monohydrate and dihydrate salts provides materials which are easily applied to the conventional, porous, sintered plaque materials without significantly reducing the strength of the plaque materials. That is, when the powdered nitrate salts are melted in contact with the porous plaque material, the fact that the nitrate materials have a low water content means that the formation of corrosive reactants is minimized. Further, because only a thin layer of the nitrate materials is melted in contact with the plaque materials, relatively low melting temperatures are sufficient to permit the melted nitrate materials to flow readily into the plaque pores. The duration of the contact between molten nitrate materials and the porous plaque materials is also minimized. This results in proper impregnation of the plaque with minimal plaque corrosion and with minimum reduction of the strength of the plaque materials. Most important, the volume of the powdered materials applied to the plaque is reduced to only a small extent during melting of the nitrate materials so that the plaque pores are filled to the desired capacity in a single impregnation operation. Upon subsequent conversion of the nitrate impregnate to electrochemically active materials, it is found that the plaque pores are filled to the desired proportion of their plaque pore volume. For example, where the plaque pores are substantially filled with molten cadmium nitrate, the plaque pores are filled to approximately 50% of their total volume after conversion of the cadmium nitrate to active cadmium materials. Similarly, where the plaque pores are substantially filled with nickel nitrate materials, the plaque pores are filled to approximately 40% of their total pore volume after conversion of the nitrate to active nickel materials. In addition, because all of the nitrate salt material which is melted in the invented process is actually applied to the supporting plaque material, the process does not result in contamination of larger plaque immersion baths as has occurred in prior art battery plate processes using molten salt.

Although particular embodiments of the process of this invention have been described by way of illustration, it should be understood that this invention includes all modifications and equivalents thereof falling within the scope of the appended claims.

I claim:

1. The method for forming a battery electrode plate comprising the steps of dehydrating a metallic salt material selected from the group consisting of cadmium nitrate tetrahydrate and nickel nitrate hexahydrate to form cadmium nitrate monohydrate and nickel nitrate dehydrate respectively, impregnating the pores of a porous battery plaque with said selected dehydrated metallic salt in molten condition, and converting said selected salt to electrochemically active material in situ within said plaque pores.

2. A method as set forth in claim 1 wherein said plaque comprises a porous, sintered nickel plaque material.

3. A method as set forth in claim 2 wherein said plaque comprises a nickel metal mesh having nickel metal powder sintered thereto.

4. A method for forming a battery electrode plate comprising the steps of dehydrating a metallic salt material selected from the group consisting of cadmium nitrate tetrahydrate and nickel nitrate hexahydrate to form cadmium nitrate monohydrate and nickel nitrate dehydrate respectively, depositing a selected quantity of the selected metallic salt in powdered form upon a porous battery plaque, melting the selected salt for impregnating the plaque pores with said selected salt, and converting said selected salt to electrochemically active material in situ within said plaque pores.

5. A method as set forth in claim 4 wherein said salt is cathodically converted to electrochemically active material in situ within said plaque pores.

6. A method as set forth in claim 4 wherein said salt is thermally converted to electrochemically active material in situ within said plaque pores.

7. A method for forming a battery electrode plate comprising the steps of dehydrating cadmium nitrate tetrahydrate to form cadmium nitrate monohydrate, pulverizing the dehydrated salts to form a powder, spreading said powdered salts upon a porous sintered nickel plaque, melting said salts in situ upon said plaque for impregnating the plaque pores with said salts, cooling said impregnated plaque for solidifying said salts within said plaque pores, and cathodically converting said salts to electrochemically active cadmium hydroxide in situ within said plaque pores.

8. A method as set forth in claim 7 wherein said salts are melted at a temperature of approximately 200° C.

9. A method as set forth in claim 7 wherein a fluid pressure differential is established between opposite sides of said plaque during melting of said salts for facilitating impregnation of said plaque pores with said salts.

10. A method as set forth in claim 9 wherein said pressure differential is established by circulating a non-oxidizing gas through said plaque.

11. A method for forming a battery electrode plate comprising the steps of dehydrating nickel nitrate hexahydrate salts to form nickel nitrate dihydrate salts, pulverizing said dehydrated salts to form a powder, spreading said powder upon a porous, sintered nickel battery plaque, melting said salt powder in situ upon said plaque for impregnating the plaque pores with said salts, cooling said impregnated plaque to solidify said salts, and cathodically converting said solidified salts to electrochemically active nickelic hydroxide material in situ within said paque pores.

12. A method as set forth in claim 11 wherein said salt is melted at a temperature of 230° C.

13. A method as set forth in claim 11 wherein a pressure differential is established at opposite sides of said plaque during melting of said salts for facilitating impregnation of said plaque pores with said salts.

References Cited

UNITED STATES PATENTS

| | | | |
|---|---|---|---|
| 3,211,587 | 10/1965 | Shair et al. | 136—120 |
| 3,284,237 | 11/1966 | Lambert et al. | 136—29 |
| 3,314,822 | 4/1967 | Jost | 136—24 |

WINSTON A. DOUGLAS, Primary Examiner

M. J. ANDREWS, Assistant Examiner

U.S. Cl. X.R.

117—230; 136—29; 204—230